L. A. GREENLEAF.
SPEEDOMETER.
APPLICATION FILED JUNE 8, 1910.
1,011,051.
Patented Dec. 5, 1911.
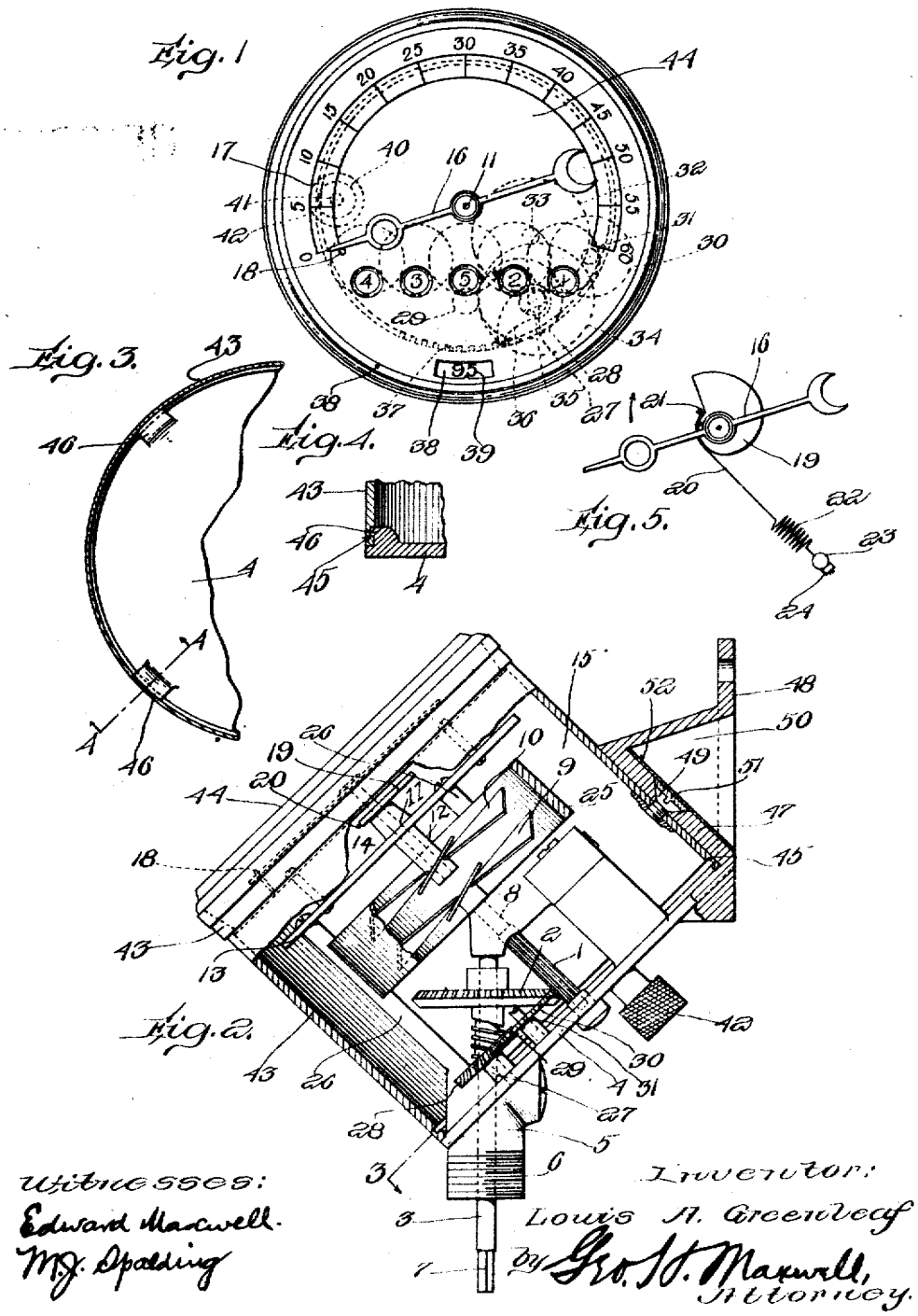
Witnesses:
Edward Maxwell.
M. J. Spalding
Inventor:
Louis A. Greenleaf
by Geo. H. Maxwell,
Attorney.

UNITED STATES PATENT OFFICE.

LOUIS A. GREENLEAF, OF DORCHESTER, MASSACHUSETTS.

SPEEDOMETER.

1,011,051.

Specification of Letters Patent.

Patented Dec. 5, 1911.

Application filed June 9, 1910. Serial No. 566,034.

*To all whom it may concern:*

Be it known that I, LOUIS A. GREENLEAF, a citizen of the United States, residing at Dorchester, in the county of Suffolk and State of Massachusetts, have invented an Improvement in Speedometers, of which the following description, in connection with the accompanying drawings, is a specification, like letters on the drawings representing like parts.

My invention is a speedometer for automobiles, etc., having for its object the provision of means not liable to need attention either for lubrication, adjustment or repair. In carrying out my invention I provide means responsive to the driving mechanism of the vehicle to generate in the speedometer a current of air, and means connected with the speed hand or indicator responsive to said air current. By this simple means I eliminate the usual train of mechanism connected to the indicator, and practically eliminate the usual frictional problem at the indicator end of the apparatus, and thereby eliminate the error and uncertainty due to said friction and to the bearings, gears, and other mechanism heretofore necessary in the usual apparatus. Also I have found that the errors commonly due to the centrifugal force resulting in the usual geared or magnetic instrument are minimized and practically eliminated by employing the pneumatic connections mentioned between the prime mover and the indicator, as the light indicator and its delicate support respond with extreme accuracy, both as to time and distance, to the free air current applied directly thereto. In response to the air current, the indicator moves instantly, there being no lag either at the beginning or at the end of said movement, and the indicating distance traversed by the indicator is exactly in proportion to the pressure or velocity of said air current. Another principal advantage is that because of this air current actuation of the indicator, whereby the latter is practically disconnected mechanically from its actuator, the accuracy of the instrument is not affected by jolts and jars of the vehicle.

In fact, a chief object of my invention has been to produce an instrument whose accuracy would not be affected by the frequent jolts and jars to which automobiles are subjected.

My invention comprises further features of advantage relating more specially to details, such as the provision of a trip indicator ring, means whereby the instrument when closed cannot readily be opened by the user, the closing means being concealed, etc., all of which will be explained in connection with the more complete detailed description of the apparatus hereinafter contained, taken with reference to the accompanying drawings, in which I have shown a preferred embodiment of my invention.

In the drawings, Figure 1 is a top plan view thereof; Fig. 2 is an approximately central vertical sectional view, parts being in elevation and parts being omitted; Fig. 3 is a fragmentary horizontal sectional view on the line 3, Fig. 2; Fig. 4 is a transverse sectional view on the line 4—4, Fig. 3; and Fig. 5 is a view in top plan of a detail of the indicator mechanism.

As herein shown, the prime mover consists of a fluted spindle or a spindle pinion 1 meshing with a beveled driving gear 2 fast on a shaft 3 which is journaled in the main frame or base plate 4 of the instrument and projects at its outer end through an otherwise solid boss 5 threaded at 6 for a flexible shaft connection (not shown) to contain a usual flexible shaft driven from the wheel of the vehicle, the outer end of the shaft 3 being herein shown as squared at 7 to receive said flexible shaft in well known manner. On the upper end 8 of the driving spindle is fixed a fan 9 or equivalent wind producer, to generate a current of air directed on an air responsive device, herein shown as a similar fan 10, which except for the air connection between the two is otherwise unconnected with the prime moving parts contained in the lower portion of the speedometer. This fan 10 is provided with a short shaft 11 journaled in a bearing 12 provided in a supporting diaphragm 13 or otherwise braced which provides an outer chamber 14 and a lower chamber 15. Secured to the outer end of the shaft 11 is a speed hand or pointer 16 or any usual or preferred means, for indicating to the observer the speed of travel, said speed hand being herein shown as coöperating with a speed scale 17, the zero being shown as beginning at the limiting post 18 against which the hand 16 is held when not in use. Any suitable means may be provided for holding the speed hand in normal position against the movement of the fan 10, said means as herein shown consisting of an eccentric lever or plate 19 fast on the shaft 11 just above the bearing 12, to which plate a flexible cord or wire 20 is secured at 21 provided with a spring 22 supported in a post 23 and adjustable by a nut 24. I find it of advantage to provide an annular housing or current director 25 surrounding the two fans and open at its opposite ends for the passage therethrough and laterally therefrom of the air current, said annulus or director 25 being supported on the frame posts 26 of the instrument which extend rigidly upward from the base 4. Also mounted on said base is a stub shaft 27 provided with a worm-wheel 28 meshing with a worm 29 fast on the under side of the gear 2 for driving a train of gears 30, 31, 32, 33, 34. The latter is provided with an eccentric 35 which operates a pawl 36 in engagement with the ratchet teeth 37 of an indicator ring 38 whose figures 39 indicate the distance of any given trip, said ring being turned around to zero at any time desired by a gear 40, the outer end of whose post 41 terminates in a thumb nut 42 for this purpose. A usual odometer is also preferably provided, to be driven by the same train of gears, the same however not constituting a feature of my present invention. The foregoing apparatus is inclosed by a shell 43 having a glass outer end 44 and at its inner lower rim provided with a groove 45 to receive two lugs 46 projecting upward from the base 4 as shown in Fig. 4. The shell 43 is slightly larger than the dial plate or diaphragm 13, so that when it is placed over the mechanism it is moved to one side slightly so as to permit the overhanging lugs 46 to enter the groove 45 at that side of the instrument, and is then moved laterally so as to bring the lugs into interlocking engagement with the shell, which when in this position fits snugly against a supporting wall 47 of a holding bracket 48, where it is secured by a screw 49. The bracket 48 is provided at its rear side with a recess 50 and when the screw 49 has been turned home I cover it with a layer of putty or cement 51 and then paint or enamel the adjacent surface with a coating 52, whereby the screw 49 is entirely concealed. The general object of the housing construction and securing means which I have just explained is to prevent the ordinary user from getting at the interior mechanism of the speedometer, which is also thus practically hermetically sealed. I have found that the average user of such devices on automobiles has a strong inclination to investigate, adjust and otherwise tamper with his speedometer, and as the instrument is necessarily delicate, and, if reliable, must be let alone, I have provided the above described construction for securing this result. I have provided a mechanism in which the speed indicator portion thereof is, as previously stated, not mechanically connected with the moving portion thereof but in which the power transmitting means consists of a controlled current of air, and accordingly it is of considerable practical value to have in connection therewith a construction whereby this air control cannot be externally influenced or tampered with.

The operation of my invention has already been explained in connection with its construction. As the shaft 3 and its gear 2 rotate the pinion 1 and fan 9, a current of air is produced, varying in velocity with the speed of the fan, and this current of air operates on the fan 10 to rotate the latter and thereby actuate the indicator, herein shown as the distance hand 16. The diaphragm 13 keeps the blast of air from influencing the indicator in any way, and the eccentric lever 19 and spring maintain a uniform movement of the latter under the varying velocity of the air current.

It will be obvious to those skilled in the art that various regulating means may be employed, and also that the operation of the device may be materially regulated and varied by varying the relative proportions and constructions of the two fans. Also it is to be noted that my device may be operated in either direction, the main difference being that the fan 10 is operated in one direction by a suction current and in the other direction by an impinging current, the direction of numbering the scale and the direction of pull of the regulating spring corresponding, of course, to the direction of rotation of the fan mechanism.

As already implied, it will be understood that my invention may be embodied in a wide range of mechanical constructions, certain features of my invention, as will be more apparent from the claims, being broadly new.

Having described my invention, what I claim as new and desire to secure by Letters Patent is:

1. A speedometer comprising an inclosure, a continuous hollow cylindrical member therein, means for holding said member in spaced apart relation to the walls thereof to leave an open annular space, air current producing means wholly within said cylindrical member, a drawing connection thereto, and means also wholly within said cylindrical member responsive to an air current and having connected thereto a device to indicate the force thereof, said parts being constructed and arranged to produce a closed circulation of air in one direction through the interior of said cylindrical member, returning in the opposite direction through said unobstructed open annular space.

2. A speedometer, comprising a tight inclosure, a continuous hollow cylindrical member, means for holding said member in spaced apart relation to the walls thereof to form an unobstructed annular space, air current producing means mounted wholly within said member, a driving connection thereto, means also wholly within said member responsive to an air current and a device connected to be operated thereby to indicate the force thereof, said parts being constructed to maintain a closed circulation of air in one direction through said hollow cylindrical member and in the other direction through the unobstructed annular space between the same and the wall of said inclosure.

3. A speedometer, comprising an inclosing cylinder, a hollow cylindrical section having a mounting in said cylinder in spaced apart relation to the cylindrical wall thereof, air current producing means mounted wholly within said section and having a driving connection extending therefrom, and means also wholly within said section responsive to an air current and having connected thereto a device to indicate the force thereof, said parts being fitted to the interior of said section and constructed to cause a closed circulation of air in one direction through said cylindrical section and to permit its free return without interference through the annular space between said cylindrical section and said inclosing cylinder.

4. A speedometer, comprising a tight inclosure, a continuous and hollow cylindrical member, means for holding said member in spaced-apart relation to the walls of said inclosure to leave an unobstructed annular space therebetween, a fan fitted to rotate wholly within said member, having a mounting coaxial therewith and a driving connection, a second fan mounted opposite said first fan and fitted to rotate wholly within said member, and means connected to said second fan for indicating the force of an air current generated by said first fan, said parts being constructed to maintain a closed circulation of air in one direction through said hollow cylindrical member and in the other direction through the unobstructed annular space between the same and the wall of said inclosure.

5. A speedometer, comprising a base, indicating mechanism, an inclosure for the latter immovably secured to said base when in operative position, the securing means being externally inaccessible, a bracket for fastening the apparatus to the vehicle, means for removably securing the said apparatus to the bracket, and means for concealing the securing means within the bracket.

6. A speedometer, comprising a base provided at its front side adjacent one edge with overhanging radially projecting lugs, indicating mechanism, an inclosure for the latter having adjacent its lower edge an inwardly opening groove for receiving said lugs, a bracket adjacent the opposite edge of said base, and threaded means operable from the rear of said bracket for securing said inclosure in place on said base and against the bracket.

7. A speedometer, comprising a base, indicating mechanism, an inclosure for the latter immovably secured to said base when in operative position, the securing means being externally inaccessible, a bracket for fastening the apparatus to the vehicle, said bracket containing a cavity opening toward the rear and extending forwardly into the bracket, and a screw-hole adjacent said inclosure, a screw fitting said hole and having threaded engagement with said inclosure, and a protecting coating for concealing said screw and covering the adjacent surface of the bracket within said cavity.

In testimony whereof, I have signed my name to this specification, in the presence of two subscribing witnesses.

LOUIS A. GREENLEAF.

Witnesses:
  Geo. H. Maxwell,
  M. J. Spalding.

Corrections in Letters Patent No. 1,011,051.

It is hereby certified that in Letters Patent No. 1,011,051, granted December 5, 1911, upon the application of Louis A. Greenleaf, of Dorchester, Massachusetts, for an improvement in "Speedometers," an error appears in the printed specification requiring correction as follows: Page 2, line 120, for the word "drawing" read *driving;* and that the said Letters Patent should be read with this correction therein that the same may conform to the record of the case in the Patent Office.

Signed and sealed this 26th day of December, A. D., 1911.

[SEAL.]
C. C. BILLINGS,
*Acting Commissioner of Patents.*